US012032326B2

(12) United States Patent
Itabashi et al.

(10) Patent No.: US 12,032,326 B2
(45) **Date of Patent: *Jul. 9, 2024**

(54) CARTRIDGE INCLUDING HOLDER FOR HOLDING ELECTRICAL CONTACT SURFACE AND METHOD OF RECYCLING CARTRIDGE

(71) Applicant: BROTHER KOGYO KABUSHIKI KAISHA, Nagoya (JP)

(72) Inventors: Nao Itabashi, Nagoya (JP); Kazuya Kamikawa, Nagakute (JP); Shuhei Hatano, Nagoya (JP); Kazuaki Ooka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,257

(22) Filed: May 19, 2023

(65) Prior Publication Data

US 2023/0288865 A1 Sep. 14, 2023

Related U.S. Application Data

(63) Continuation of application No. 17/880,742, filed on Aug. 4, 2022, now Pat. No. 11,693,353, which is a (Continued)

(30) Foreign Application Priority Data

Apr. 1, 2020 (JP) ................................ 2020-065738

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.

CPC ..... *G03G 21/1652* (2013.01); *G03G 15/0863* (2013.01); *G03G 15/0865* (2013.01); *G03G 21/181* (2013.01); *G03G 21/1875* (2013.01)

(58) Field of Classification Search

CPC ........... G03G 15/0863; G03G 15/0865; G03G 15/0894; G03G 21/1647; G03G 21/1652; (Continued)

(56) References Cited

U.S. PATENT DOCUMENTS

| | | | |
|---|---|---|---|
| 5,576,820 | A | 11/1996 | Hagihara et al. |
| 11,435,690 | B2 | 9/2022 | Itabashi |

(Continued)

FOREIGN PATENT DOCUMENTS

| | | | |
|---|---|---|---|
| CN | 203573089 | U | 4/2014 |
| EP | 1 363 168 | A1 | 11/2003 |

(Continued)

OTHER PUBLICATIONS

International Search Report and Written Opinion issued in corresponding International Patent Application No. PCT/JP2021/013634, Jun. 15, 2021.

(Continued)

*Primary Examiner* — Sophia S Chen
(74) *Attorney, Agent, or Firm* — Merchant & Gould P.C.

(57) ABSTRACT

A cartridge includes: a housing; a storage medium; and a holder. The storage medium has an electrical contact surface. The holder is movable relative to the housing. The holder includes: a first holder member; and a second holder member. The first holder member has a pawl portion and is configured to hold the electrical contact surface. The second holder member includes a corner portion. The pawl portion is engageable with the corner portion. The second holder member has a through-hole. An engagement part of the pawl portion engaging with the corner portion is accessible from (Continued)

outside the second holder member through the through-hole in a state where the pawl portion engages with the corner portion.

15 Claims, 9 Drawing Sheets

Related U.S. Application Data continuation of application No. 17/217,222, filed on Mar. 30, 2021, now Pat. No. 11,435,690.

(58) Field of Classification Search
CPC ............. G03G 21/1676; G03G 21/181; G03G 21/1875; G03G 21/1885; G03G 2215/00987; G03G 2221/1823
See application file for complete search history.

(56) References Cited

U.S. PATENT DOCUMENTS

| | | | | |
|---|---|---|---|---|
| 11,693,353 | B2 * | 7/2023 | Itabashi | G03G 21/1652 399/262 |
| 2010/0008693 | A1 | 1/2010 | Hayashi et al. | |
| 2015/0037059 | A1 | 2/2015 | Yang et al. | |
| 2017/0184998 | A1 | 6/2017 | Itabashi | |
| 2017/0185032 | A1 | 6/2017 | Itabashi et al. | |
| 2017/0269544 | A1 | 9/2017 | Itabashi | |
| 2018/0203377 | A1 | 7/2018 | Wakamatsu | |
| 2018/0314202 | A1 | 11/2018 | Yokoi | |
| 2018/0373195 | A1 | 12/2018 | Itabashi | |
| 2019/0265641 | A1 | 8/2019 | Yokoi | |
| 2020/0249593 | A1 | 8/2020 | Ajima et al. | |
| 2021/0063911 | A1 | 3/2021 | Kiriyama et al. | |
| 2021/0063961 | A1 | 3/2021 | Itabashi et al. | |

FOREIGN PATENT DOCUMENTS

| | | | |
|---|---|---|---|
| JP | 8-6407 | A | 1/1996 |
| JP | 2007-47397 | A | 2/2007 |
| JP | 3196279 | U | 3/2015 |
| JP | 2017-116826 | A | 6/2017 |
| JP | 2017-116828 | A | 6/2017 |
| JP | 2018-189740 | A | 11/2018 |
| JP | 2019-144480 | A | 8/2019 |

OTHER PUBLICATIONS

Extended European Search Report issued in corresponding European Patent Application No. 21166367.9, Jul. 15, 2021.
Office Action (Notice of Reasons for Refusal) issued in corresponding Japanese Patent Application No. 2020-065738, Nov. 21, 2023.
Extended European Search Report issued in correspondeing European application 23210106.3, Feb. 13, 2024.

* cited by examiner

CARTRIDGE INCLUDING HOLDER FOR HOLDING ELECTRICAL CONTACT SURFACE AND METHOD OF RECYCLING CARTRIDGE

CROSS REFERENCE TO RELATED APPLICATION

This application is a continuation of U.S. patent application Ser. No. 17/880,742 filed Aug. 4, 2022, now U.S. Pat. No. 11,693,353, which is a continuation of U.S. patent application Ser. No. 17/217,222 filed Mar. 30, 2021, now U.S. Pat. No. 11,435,690, which claims priority from Japanese Patent Application No. 2020-065738 filed Apr. 1, 2020. The entire content of the priority applications is incorporated herein by reference.

TECHNICAL FIELD

The present disclosure relates to a cartridge, and a method of recycling a cartridge.

BACKGROUND

Electrophotographic image-forming devices, such as laser printers and LED printers, are well known in the art. Such image-forming devices use a developing cartridge. The developing cartridge has a developing roller for supplying toner. A prior art describes one such conventional developing cartridge. The developing cartridge includes a holder for holding a storage medium.

SUMMARY

When recycling a developing cartridge having a storage medium, the information in the storage medium may be overwritten or the storage medium itself is replaced. However, in the structure of the developing cartridge described above, a cover for covering the holder may be fixed to the housing of the developing cartridge by a screw. Consequently, the cover is necessary to be removed when information in the storage medium is overwritten or the storage medium itself is replaced, thereby increasing the workload required for recycling the cartridge. Further, after repeatedly removing and inserting a screw used to fix the cover, the screw hole may become deformed and no longer able to fix the screw firmly.

In view of the foregoing, it is an object of the present disclosure to provide a technology capable of reducing the workload required for, for example, recycling a cartridge possessing a holder.

In order to attain the above and other objects, according to one aspect, the present disclosure provides a cartridge including: a housing; a storage medium; and a holder. The storage medium has an electrical contact surface. The holder is movable relative to the housing. The holder includes: a first holder member; and a second holder member. The first holder member has a pawl portion. The first holder member is configured to hold the electrical contact surface. The second holder member includes a corner portion. The pawl portion is engageable with the corner portion. The second holder member has a through-hole. An engagement part of the pawl portion engaging with the corner portion is accessible from outside the second holder member through the through-hole in a state where the pawl portion engages with the corner portion.

According to another aspect, the present disclosure provides a method of recycling a cartridge. The cartridge includes a holder. The holder has: a first holder member; and a second holder member. The first holder member is configured to hold an electrical contact surface. The first holder member engages with the second holder member. The method includes: (a) releasing; and (b) removing. The (a) releasing releases engagement of the first holder member with the second holder member. The (b) removing removes the first holder member from the second holder member in a state where the second holder member remains held in the cartridge.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, one embodiment of the present disclosure will be described while referring to the accompanying drawings.

In the following description of the embodiment, a direction crossing electrical contact surfaces of a memory will be referred to as "first direction." Further a direction in which a rotational axis of a developing roller extends will be referred to as "second direction." Further, with respect to a housing of a developing cartridge including the developing roller, a direction connecting one side of the housing to another side opposite to the one side will be referred to as "third direction." The first direction and the second direction cross each other (and preferably are orthogonal to each other). The second direction and the third direction cross each other (and preferably are orthogonal to each other). The third direction and the first direction cross each other (and preferably are orthogonal to each other).

1. Overall Structure of a Developing Cartridge

Figure 1:
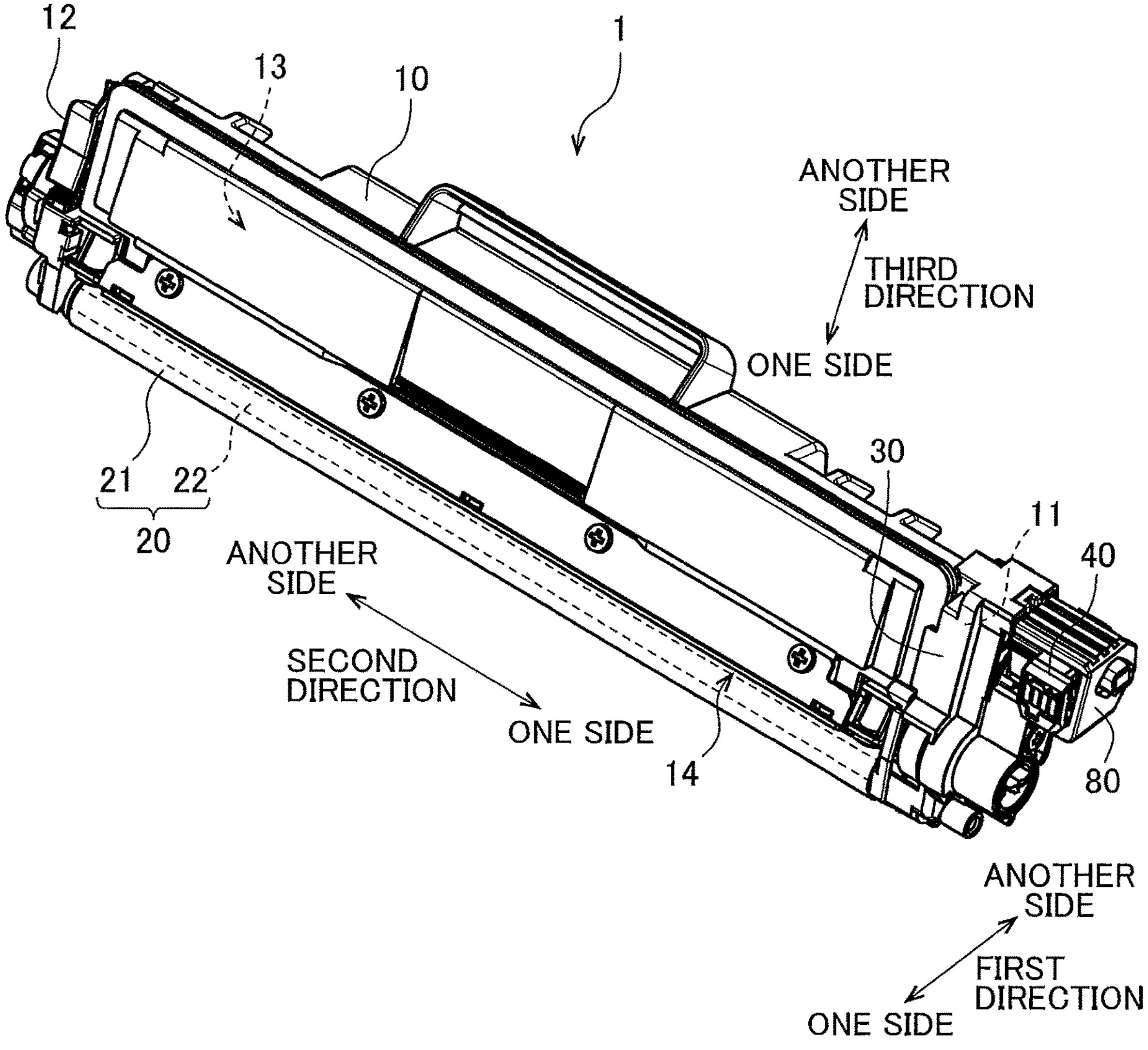
FIG. 1 is a perspective view of a developing cartridge according to one embodiment of the present disclosure.

FIG. 1 is a perspective view of a developing cartridge 1. The developing cartridge 1 is used in an electrophotographic image-forming device. The electrophotographic image-forming device may be a laser printer or an LED printer, for example. The developing cartridge 1 is attached to a drum cartridge. With the developing cartridge 1 attached thereto, the drum cartridge is attached to the image-forming device. The developing cartridge 1 supplies developer to a photosensitive drum provided in the drum cartridge. The developer is toner, for example.

Note that one or more developing cartridges 1 may be attached to a single drum cartridge.

As illustrated in FIG. 1, the developing cartridge 1 has a casing 10, a developing roller 20, a gear cover 30, a memory assembly 40, and a holder cover 80.

The casing 10 is a housing that can accommodate developer therein. The casing 10 has a first outer surface 11 and a second outer surface 12. The first outer surface 11 and the second outer surface 12 are separated from each other in the second direction. The gear cover 30, the memory assembly 40, and the holder cover 80 are positioned at the first outer surface 11. The casing 10 extends in the second direction between the first outer surface 11 and the second outer surface 12. An accommodating chamber 13 is provided inside the casing 10 for accommodating developer.

The developing roller 20 rotates about a rotational axis extending in the second direction. The casing 10 has an opening 14. The opening 14 allows the accommodating chamber 13 to be communicated with the outside of the casing 10. The opening 14 is positioned at one end portion of the casing 10 in the third direction. The developing roller 20 is positioned in the opening 14. Hence, the developing roller 20 is also positioned at the one end portion of the casing 10 in the third direction.

The developing roller 20 has a developing-roller body 21, and a developing-roller shaft 22. The developing-roller body 21 is a cylindrically shaped member extending in the second direction. An elastic rubber is used as the material of the developing-roller body 21, for example. The developing-roller shaft 22 is a columnar member that penetrates the developing-roller body 21 in the second direction. A metal or conductive resin is used as the material of the developing-roller shaft 22.

Note that the developing-roller shaft 22 need not penetrate through the developing-roller body 21 in the second direction. For example, developing-roller shafts 22 may extend outward in the second direction from both ends of the developing-roller body 21 in the second direction.

The developing-roller body 21 is fixed to the developing-roller shaft 22 so as not to be relatively rotatable to the developing-roller shaft 22. Further, one end portion of the developing-roller shaft 22 on one side in the second direction is fixed to a developing-roller gear (not illustrated) so as not to be relatively rotatable to the developing-roller gear. Hence, when the developing-roller gear rotates, the developing-roller shaft 22 also rotates, and the developing-roller body 21 rotates together with the developing-roller shaft 22.

When the developing cartridge 1 receives a drive force, developer is supplied from the accommodating chamber 13 in the casing 10 onto the outer circumferential surface of the developing roller 20 via a supply roller (not illustrated). At this time, the developer is tribocharged between the supply roller and the developing roller 20. Additionally, a bias voltage is applied to the developing-roller shaft 22 of the developing roller 20. Accordingly, the electrostatic force between the developing-roller shaft 22 and the developer attracts developer to the outer circumferential surface of the developing-roller body 21.

The developing cartridge 1 also has a thickness-regulating blade (not illustrated). The thickness-regulating blade regulates a layer of developer supplied onto the outer circumferential surface of the developing-roller body 21 at a uniform thickness. Subsequently, the developer carried on the outer circumferential surface of the developing-roller body 21 is supplied onto the photosensitive drum in the drum cartridge. At this time, developer is transferred from the developing-roller body 21 onto the photosensitive drum in areas of an electrostatic latent image formed on the outer circumferential surface of the photosensitive drum, thereby developing the latent image into a visible image carried on the outer circumferential surface of the photosensitive drum.

The gear cover 30 is positioned at one end of the casing 10 in the first direction. The gear cover 30 is fixed to the first outer surface 11 of the casing 10. Together with the casing 10, the gear cover 30 configures the housing of the developing cartridge 1. A plurality of gears including the developing-roller gear described above is disposed between the first outer surface 11 of the casing 10 and the gear cover 30.

2. Memory Assembly and Holder Cover

Figure 2:
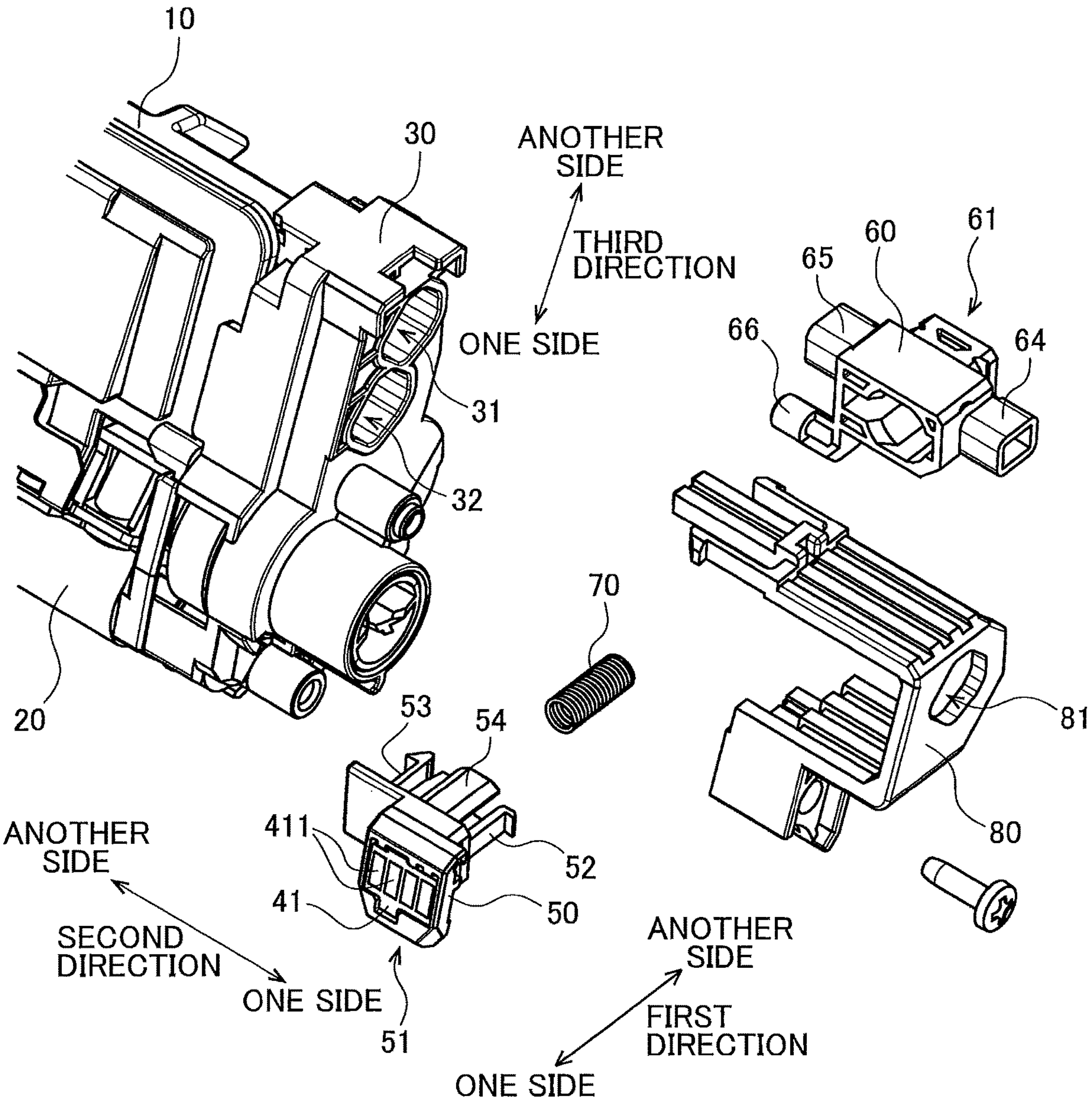
FIG. 2 is a partial exploded perspective view of the developing cartridge according to the embodiment.
Figure 3:
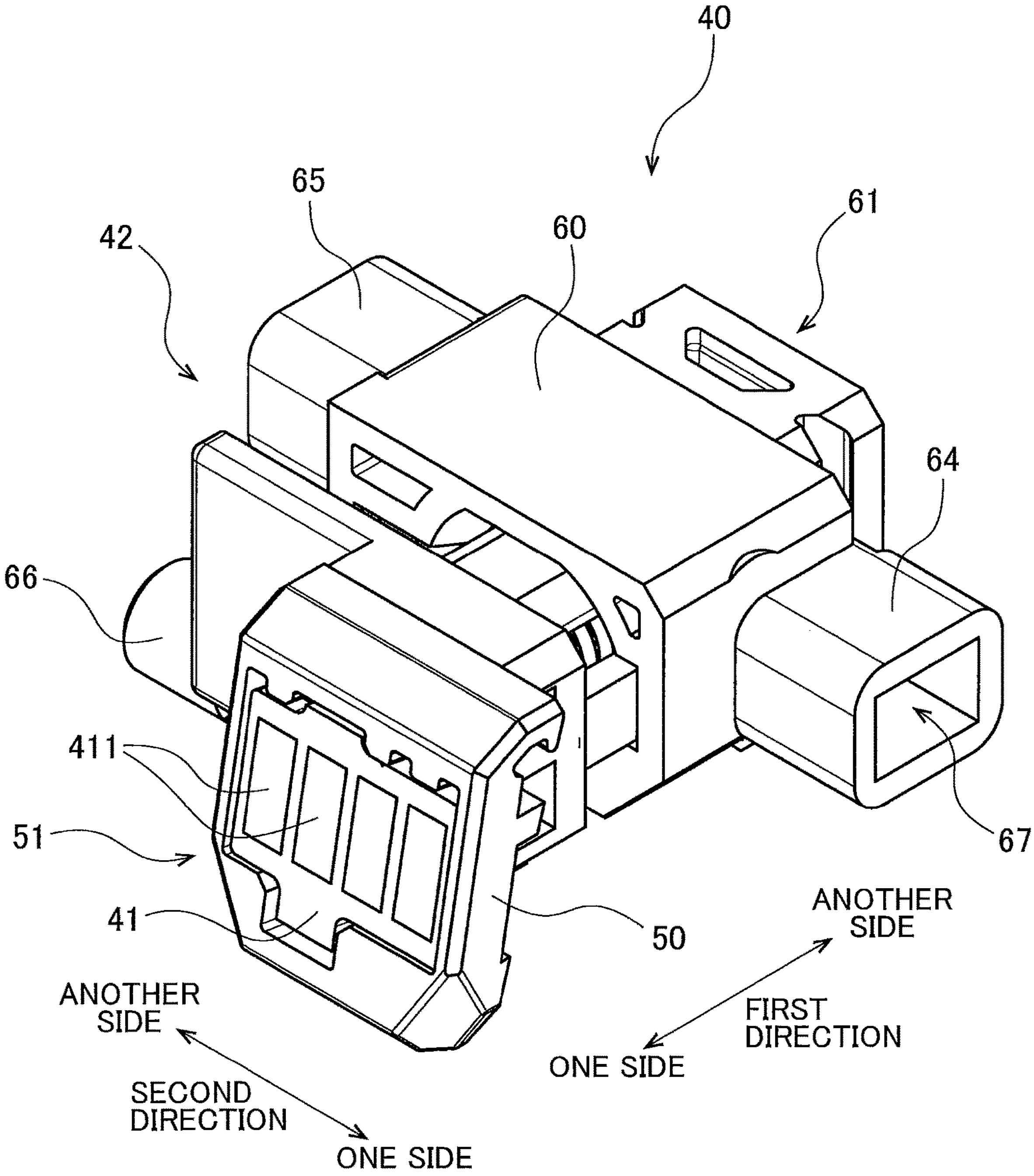
FIG. 3 is a perspective view of a memory assembly of the developing cartridge according to the embodiment.
Figure 4:
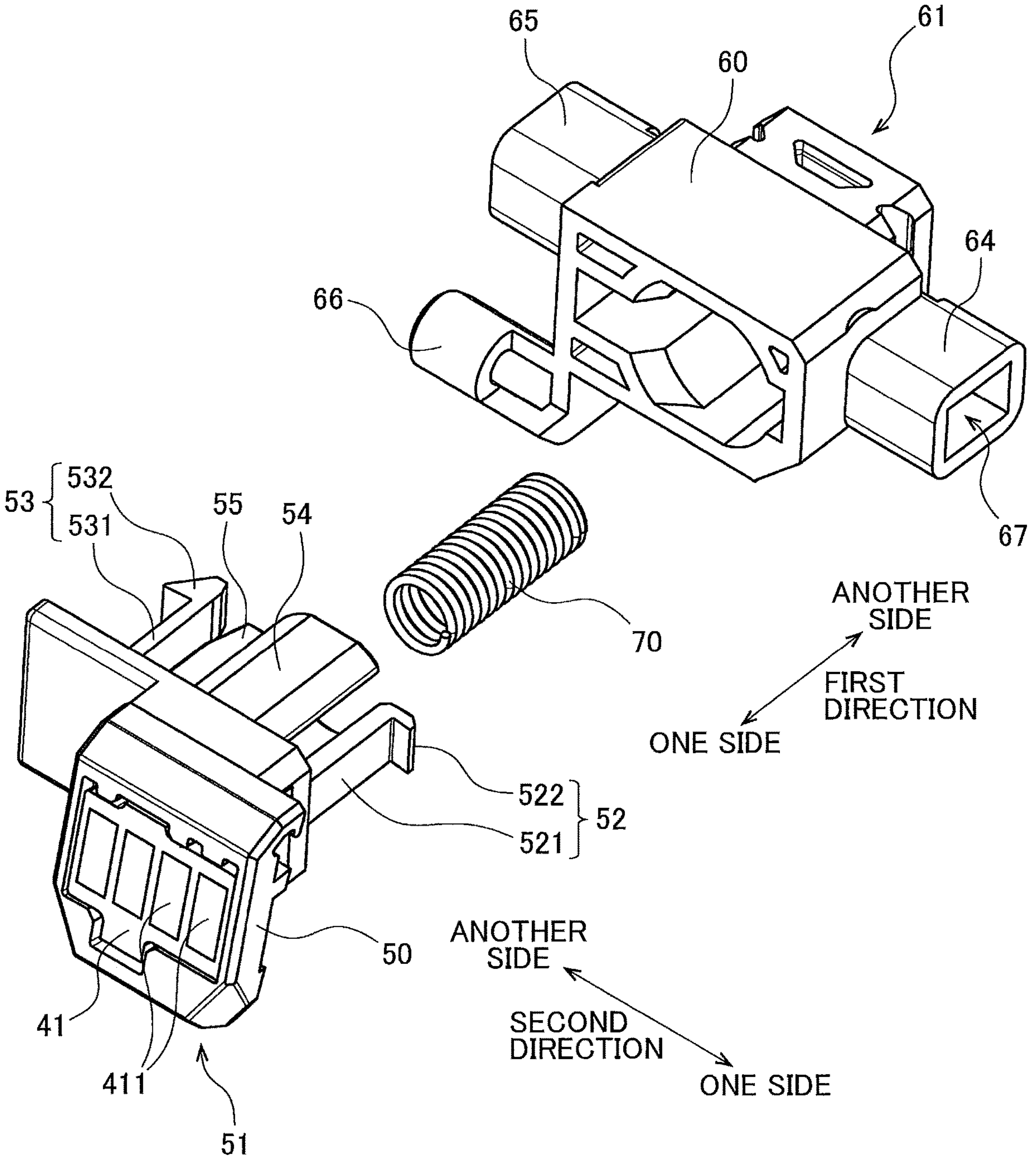
FIG. 4 is an exploded perspective view of the memory assembly of the developing cartridge according to the embodiment.
Figure 5:
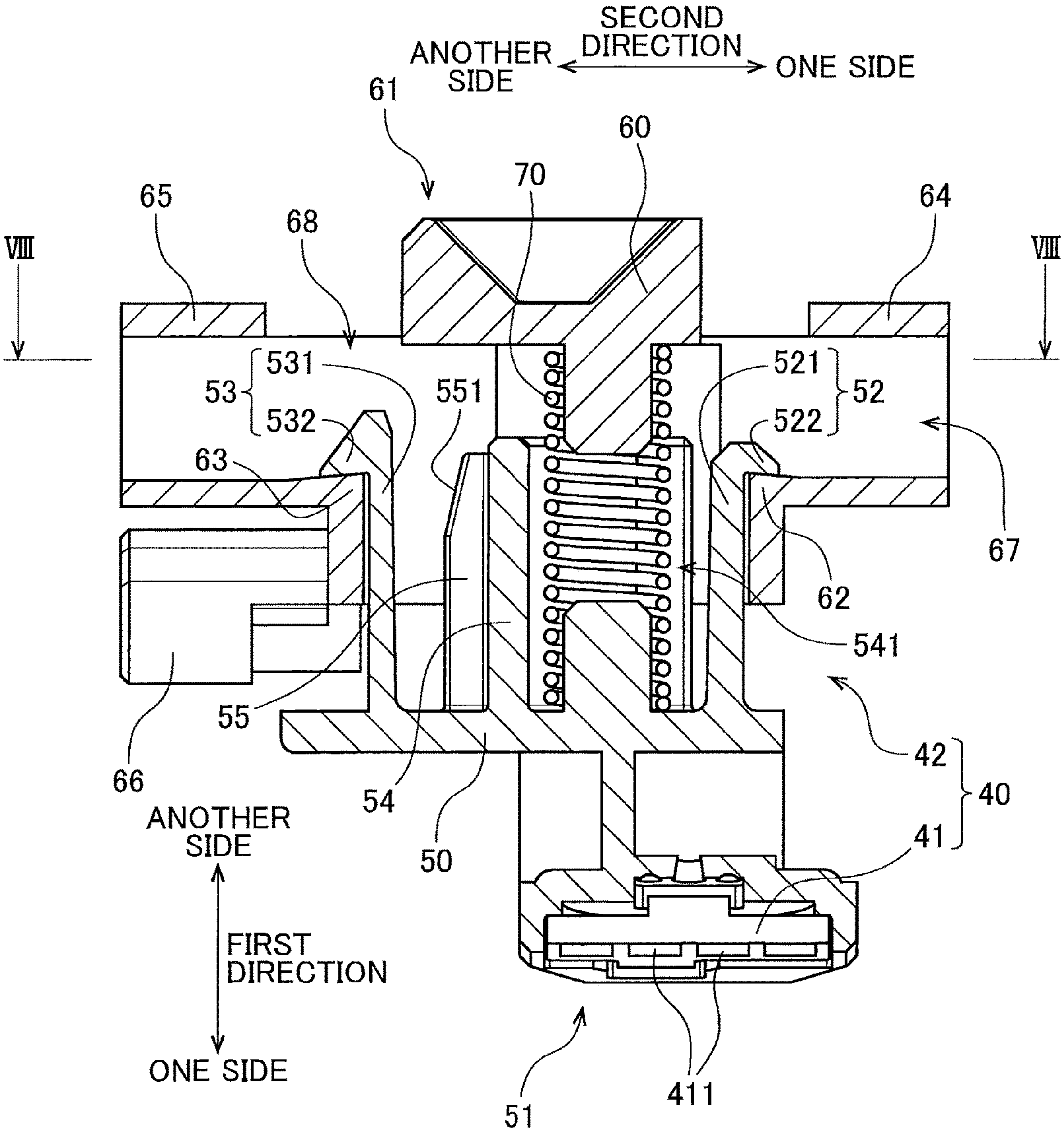
FIG. 5 is a cross-sectional view of the memory assembly when a coil spring in the memory assembly is in a first state and a first holder member is in engagement with a second holder member in the memory assembly.
Figure 6:
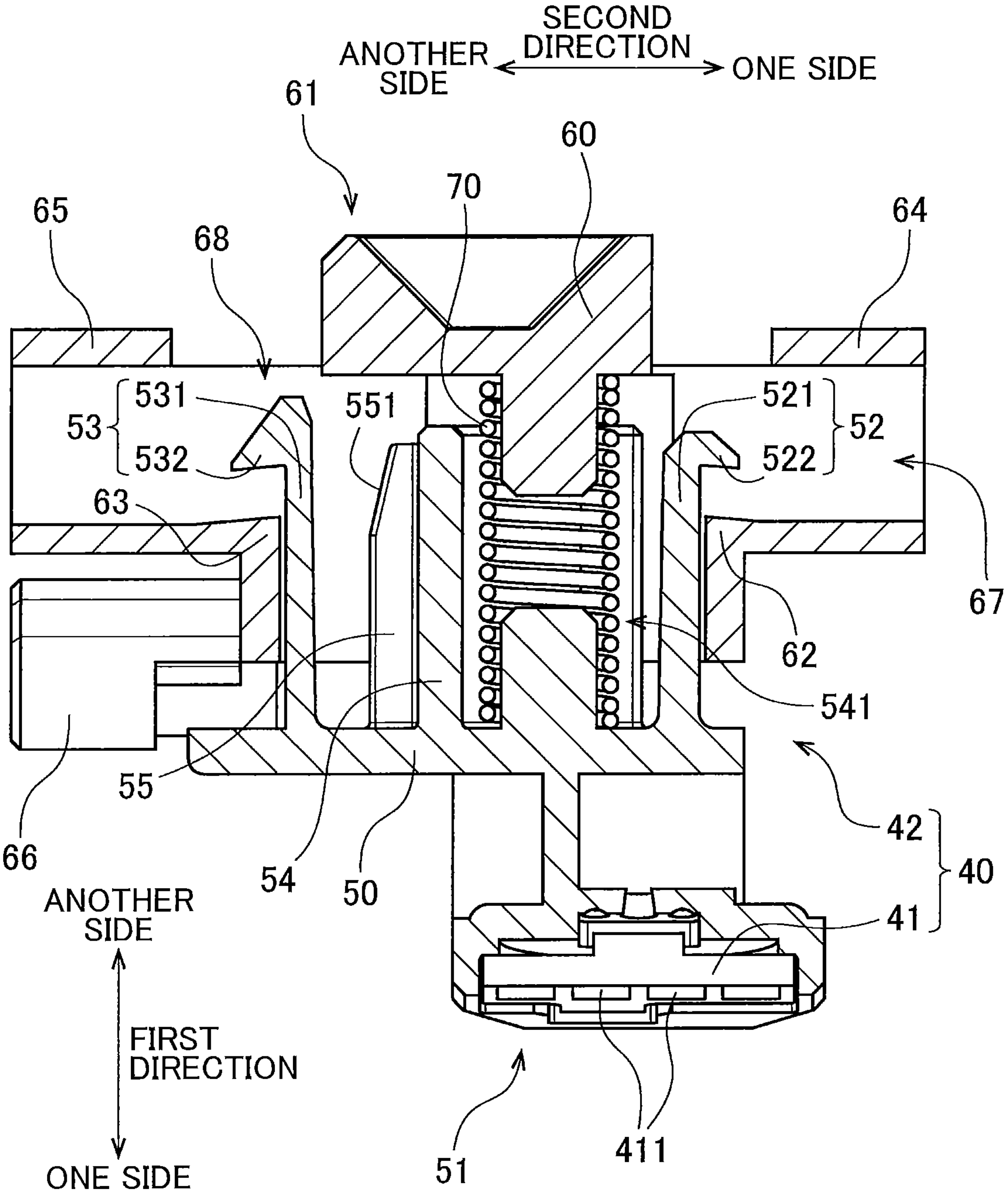
FIG. 6 is a cross-sectional view of the memory assembly when the coil spring in the memory assembly is in a second state.
Figure 7:
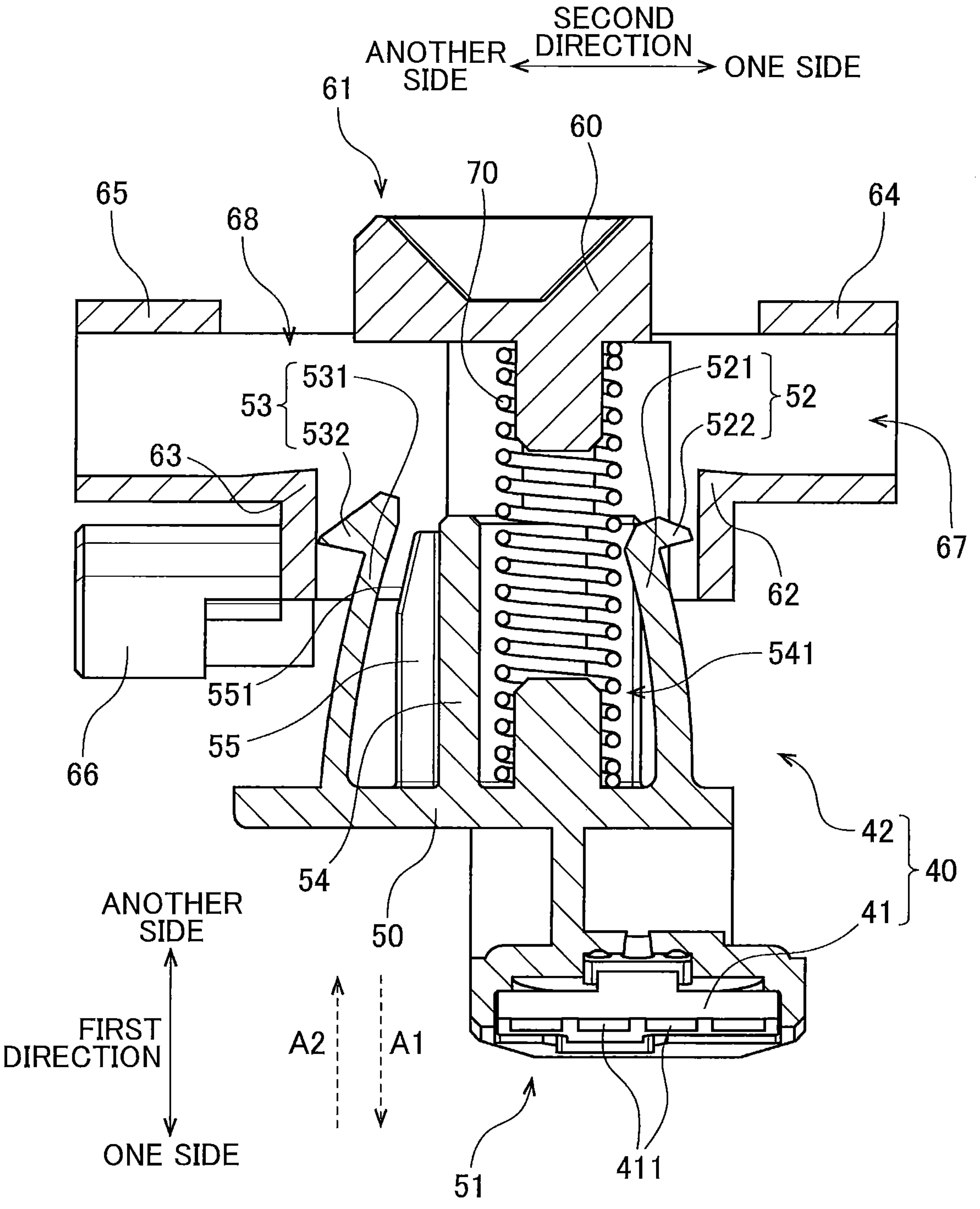
FIG. 7 is a cross-sectional view of the memory assembly when releasing engagement of a first holder member with a second holder member in the memory assembly.
Figure 8:
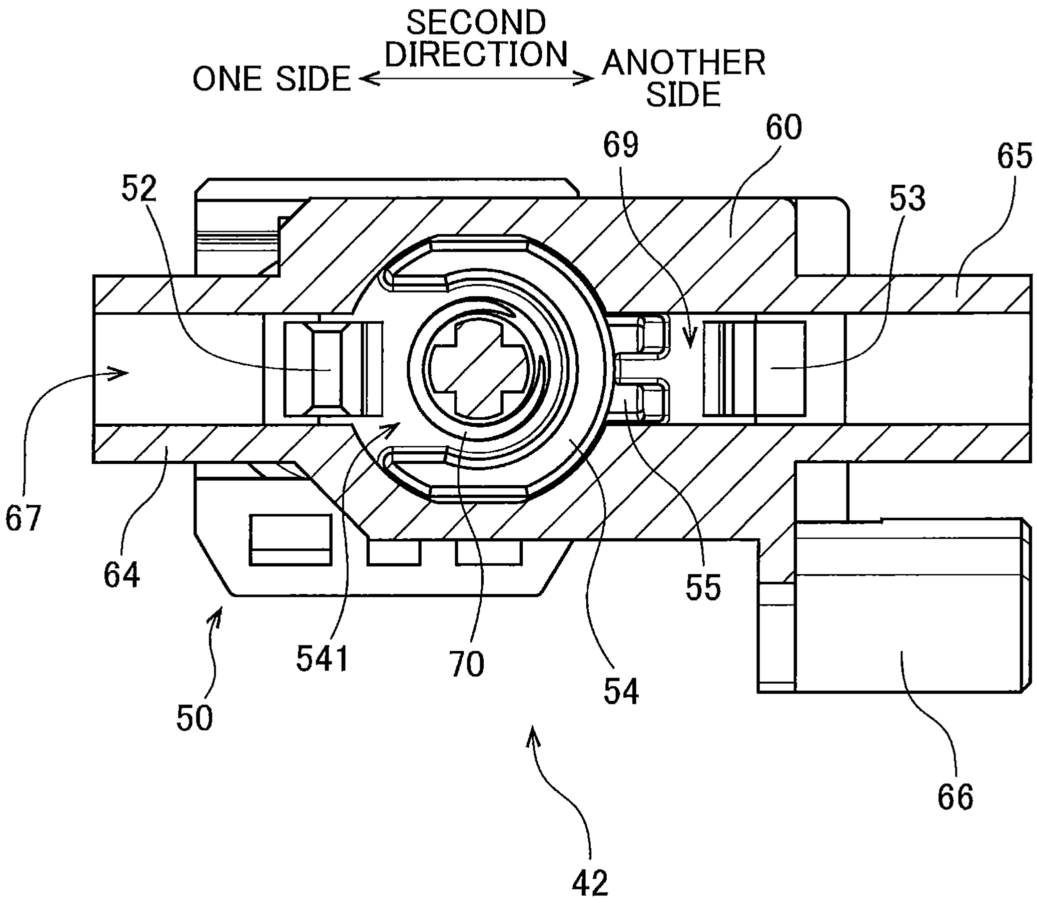
FIG. 8 is a cross-sectional view of the memory assembly taken along a line VIII-VIII in FIG. 5.

Next, the memory assembly 40 and the holder cover 80 will be described. FIG. 2 is a partial exploded perspective view of the developing cartridge 1. FIG. 3 is a perspective view of the memory assembly 40. FIG. 4 is an exploded perspective view of the memory assembly 40. FIGS. 5 through 7 are cross-sectional views of the memory assembly 40. FIG. 8 is a cross-sectional view of the memory assembly 40 taken along a line VIII-VIII in FIG. 5.

The memory assembly 40 is positioned at the one end of the casing 10 in the second direction. Specifically, the memory assembly 40 is positioned at the outer surface of the gear cover 30. As illustrated in FIGS. 2 through 7, the memory assembly 40 has a memory 41, and a holder 42 that holds the memory 41. The memory 41 is positioned at the outer surface of one side of the holder 42 in the first direction.

The memory 41 is a storage medium that stores information related to the developing cartridge 1. The memory 41 stores at least one of identification information and lifetime information for the developing cartridge 1. The identification information includes at least one of a manufacturing serial number for the developing cartridge 1, and an ID code indicating that the developing cartridge 1 is a genuine product, for example. The lifetime information includes at least one of the developer capacity of the developing cartridge 1, the life of the developing roller 20, information indicating whether the developing cartridge 1 is a new product, the accumulated number of rotations of the developing roller 20, the accumulated number of pages printed with the developing roller 20, and error history, for example. In addition to identification information and lifetime information, the memory 41 may store compatible models for the developing cartridge 1 and the like.

The memory 41 has four electrical contact surfaces 411. The four electrical contact surfaces 411 are surfaces on which metal conductors are exposed. The four electrical contact surfaces 411 are electrically connected to the memory 41. The four electrical contact surfaces 411 are arranged in the second direction. Although four electrical contact surfaces 411 are used in the present embodiment, the number of electrical contact surfaces 411 the memory 41 has may be three or less or five or greater.

As illustrated in FIGS. 2 through 7, the holder 42 has a first end portion 51 and a second end portion 61. The first end portion 51 constitutes an end portion of the holder 42 at one side in the first direction. The second end portion 61 constitutes an end portion of the holder 42 at another side in the first direction. The first end portion 51 and the second end portion 61 are separated in the first direction. Additionally, the first end portion 51 can move relative to the second end portion 61 in the first direction.

More specifically, the holder 42 in the present embodiment has a first holder member 50, a second holder member 60, and a coil spring 70 positioned between the first holder member 50 and the second holder member 60. The first holder member 50 is made of a resin material, for example. The second holder member 60 is also made of a resin material, for example. The first holder member 50 can move relative to the second holder member 60 in the first direction. The first holder member 50 has the first end portion 51 described above. The memory 41 is held at the outer surface of the first end portion 51. The second holder member 60 has the second end portion 61 described above.

The coil spring 70 is an elastic member extending in the first direction. The coil spring 70 is positioned between the first end portion 51 and the second end portion 61 in the first direction. One end of the coil spring 70 in the first direction is connected to the first holder member 50. The other end of the coil spring 70 in the first direction is connected to the second holder member 60. The coil spring 70 can expand and contract in the first direction between at least a first state, and a second state in which the coil spring 70 contracts more than the first state. The length of the coil spring 70 in the first direction is greater when the coil spring 70 is in the first state than when the coil spring 70 is in the second state. Therefore, the distance in the first direction between the first end portion 51 and the second end portion 61 when the coil spring 70 is in the first state is greater than the distance in the first direction between the first end portion 51 and the second end portion 61 when the coil spring 70 is in the second state. Further, the length of the coil spring 70 in the first direction at least when the coil spring 70 is in the second state is shorter than the natural length of the coil spring 70.

As illustrated in FIGS. 2 and 4 through 7, the first holder member 50 has a first pawl portion 52 and a second pawl portion 53. The first pawl portion 52 and the second pawl portion 53 are arranged in the second direction.

The first pawl portion 52 has a first arm part 521 and a first hook part 522. The first arm part 521 extends in the first direction from the surface of the first holder member 50 on the other side in the first direction toward the second end portion 61. The first hook part 522 protrudes toward one side in the second direction from the distal end of the first arm part 521.

The second pawl portion 53 has a second arm part 531 and a second hook part 532. The second arm part 531 extends in the first direction from the surface of the first holder member 50 at the other side in the first direction toward the second end portion 61. The second hook part 532 protrudes toward another side in the second direction from the distal end of the second arm part 531.

As illustrated in FIGS. 5 through 7, the second holder member 60 includes a first corner portion 62 and a second corner portion 63. The first corner portion 62 and the second corner portion 63 are positioned inside the second holder member 60. The first corner portion 62 is a portion at which a surface extending in the first direction and a surface extending in the second direction cross each other. The second corner portion 63 is also a portion at which a surface extending in the first direction and a surface extending in the second direction cross each other. The first corner portion 62 is positioned at the one side of the second corner portion 63 in the second direction.

The first hook part 522 of the first pawl portion 52 engages with the first corner portion 62. The second hook part 532 of the second pawl portion 53 engages with the second corner portion 63.

When the coil spring 70 is in the first state illustrated in FIG. 5, the first hook part 522 contacts the first corner portion 62 and the second hook part 532 contacts the second corner portion 63. This contact prevents the coil spring 70 from expanding farther in the first direction from the first state. In other words, this contact prevents the length of the coil spring 70 in the first direction from becoming greater than that when the coil spring 70 is in the first state. This contact also prevents the first holder member 50 from being removed from the second holder member 60. On the other hand, when the coil spring 70 is in the second state illustrated in FIG. 6, the first hook part 522 is separated from the first corner portion 62 toward the other side in the first direction and the second hook part 532 is separated from the second corner portion 63 toward the other side in the first direction.

The first holder member 50 also has a sleeve part 54 and a guide rib 55. The sleeve part 54 has a cylindrical shape that extends in the first direction around the coil spring 70. The guide rib 55 protrudes in the second direction from the sleeve part 54 and extends in the first direction. As illustrated in FIG. 8, the second holder member 60 has a key groove 69 extending in the first direction. The guide rib 55 is inserted into the key groove 69. With this configuration, the first holder member 50 is guided in the first direction relative to the second holder member 60.

The holder cover 80 is a member that covers at least a portion of the holder 42. The holder cover 80 is fixed to the outer surface of the gear cover 30. Specifically, the holder cover 80 is fastened by a screw to the gear cover 30. Therefore, the holder cover 80 can move together with the casing 10 and the gear cover 30. The second holder member 60 is held between the outer surface of the gear cover 30 and the holder cover 80.

Note that the holder cover 80 may be directly fastened by a screw to the casing 10 rather than being fastened by a screw to the gear cover 30. The action of fastening the holder cover 80 to the gear cover 30 with a screw will also be referred to as fastening the holder cover 80 to the housing with a screw.

As will be described later, even when the holder cover 80 is fastened with a screw, the first holder member 50 of the holder 42 can be removed alone from the holder cover 80 without removing the screw from the holder cover 80. Since the screw is not removed from the holder cover 80 in this configuration, the first holder member 50 of the holder 42 can be removed alone from the holder cover 80 in a state where the precise position of the holder cover 80 fastened with the screw is maintained. Further, since the screw does not need to be removed, this configuration reduces the number of times that the holder cover 80 or the casing 10 are fastened with a screw due to the removal of the screw. Accordingly, the holder cover 80 or the casing 10 can be used for a long period of time. This is particularly advantageous when the developing cartridge 1 is recycled.

The second holder member 60 includes a first boss 64, a second boss 65, and a third boss 66. The first boss 64 extends in the second direction toward the holder cover 80 from the surface of the second holder member 60 at the side opposite to the surface facing the gear cover 30. As illustrated in FIG.

2, the holder cover 80 also has a cover hole 81. The cover hole 81 penetrates the holder cover 80 in the second direction. The first boss 64 is inserted into the cover hole 81.

The second boss 65 and the third boss 66 extend in the second direction toward the gear cover 30 from the surface of the second holder member 60 facing the gear cover 30. In other words, the second boss 65 and the third boss 66 are positioned at the opposite side of the holder 42 from the first boss 64. The second boss 65 and the third boss 66 are arranged in the third direction. In addition, the gear cover 30 has a first housing recess 31 and a second housing recess 32. The first housing recess 31 and the second housing recess 32 are recessed inward from the outer surface of the gear cover 30 toward the other side in the second direction. The first housing recess 31 and the second housing recess 32 are arranged in the third direction. The second boss 65 is inserted into the first housing recess 31, and the third boss 66 is inserted into the second housing recess 32.

Each of the first boss 64, the second boss 65, and the third boss 66 may have a columnar shape or a prismatic shape.

The size (inner dimension) of the cover hole 81 in the third direction is greater than the size (outer dimension) of the first boss 64 in the third direction. Therefore, the first boss 64 can move in the third direction inside the cover hole 81. Further, the size (inner dimension) of the first housing recess 31 in the third direction is greater than the size (outer dimension) of the second boss 65 in the third direction. Therefore, the second boss 65 can move in the third direction inside the first housing recess 31. Further, the size (inner dimension) of the second housing recess 32 in the third direction is greater than the size (outer dimension) of the third boss 66 in the third direction. Therefore, the third boss 66 can move in the third direction inside the second housing recess 32.

Accordingly, the second holder member 60 can move together with the first boss 64, the second boss 65, and the third boss 66 in the third direction relative to the casing 10, the gear cover 30, and the holder cover 80. When the second holder member 60 moves in the third direction, the first holder member 50 moves together with the second holder member 60 in the third direction and the electrical contact surfaces 411 held on the first holder member 50 also move in the third direction.

Further, the size (inner dimension) of the cover hole 81 in the first direction is greater than the size (outer dimension) of the first boss 64 in the first direction. Therefore, the first boss 64 can move in the first direction inside the cover hole 81. Further, the size (inner dimension) of the first housing recess 31 in the first direction is greater than the size (outer dimension) of the second boss 65 in the first direction. Therefore, the second boss 65 can move in the first direction inside the first housing recess 31. Further, the size (inner dimension) of the second housing recess 32 in the first direction is greater than the size (outer dimension) of the third boss 66 in the first direction. Therefore, the third boss 66 can move in the first direction inside the second housing recess 32.

Accordingly, the second holder member 60 can move together with the first boss 64, the second boss 65, and the third boss 66 in the first direction relative to the casing 10, the gear cover 30, and the holder cover 80. When the second holder member 60 moves in the first direction, the first holder member 50 moves in the first direction together with the second holder member 60 and the electrical contact surfaces 411 held on the first holder member 50 also move in the first direction.

Note that the number of cover holes 81 formed in the holder cover 80 may be two or greater. Likewise, the number of bosses inserted into the cover holes 81 may be two or greater. Further, the number of housing recesses formed in the gear cover 30 may be one or may be three or greater. Likewise, the number of bosses inserted into these housing recesses may be one or may be three or greater. Further, in place of the housing recesses, the gear cover 30 may have housing holes for inserting the bosses thereinto.

Further, the second holder member 60 may be capable of moving in the second direction between the gear cover 30 and the holder cover 80.

Figure 9:
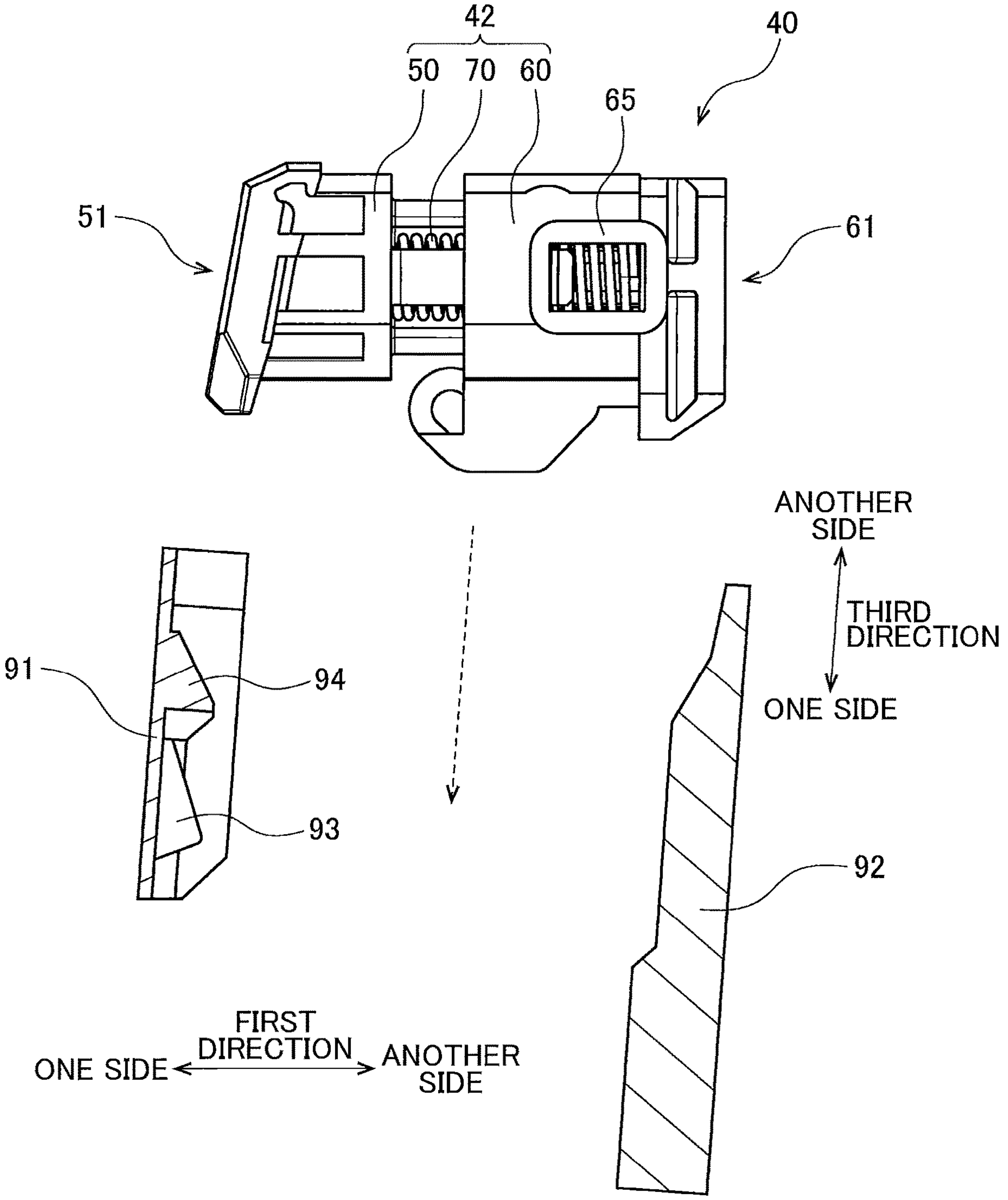
FIG. 9 is view illustrating a state of the memory assembly when the developing cartridge is attached to a drum cartridge.

FIG. 9 illustrates the state of the memory assembly 40 when the developing cartridge 1 is attached to the drum cartridge. As illustrated in FIG. 9, the drum cartridge includes a first guide plate 91 and a second guide plate 92. The first guide plate 91 and the second guide plate 92 are arranged facing each other to be spaced apart from each other in the first direction.

The first guide plate 91 has a metal electrical connector 93 capable of contacting the electrical contact surfaces 411 of the memory 41. The electrical connector 93 protrudes in the first direction from the surface of the first guide plate 91 toward the second guide plate 92. The first guide plate 91 has a guide protrusion 94 that protrudes toward the second guide plate 92. The guide protrusion 94 is positioned at a position closer to the insertion opening for the developing cartridge 1 and the drum cartridge than the electrical connector 93.

When the developing cartridge 1 is attached to the drum cartridge, the holder 42 is inserted between the first guide plate 91 and the second guide plate 92. At this time, the first holder member 50 contacts the first guide plate 91, and the second holder member 60 contacts the second guide plate 92. By moving relative to the casing 10, the holder 42 becomes positioned between the first guide plate 91 and the second guide plate 92.

Subsequently, when the guide protrusion 94 presses against the first holder member 50, the coil spring 70 contracts from the first state to the second state to shorten the length thereof in the first direction. Consequently, the distance in the first direction between the first end 51 and the second end 61 is reduced. After the first holder member 50 passes over the guide protrusion 94, the coil spring 70 once again expands in the first direction to lengthen the length thereof in the first direction. As a result, the electrical contact surfaces 411 of the memory 41 comes in contact with the electrical connector 93. In other words, the memory 41 and electrical connector 93 become electrically connected.

As described above, the holder 42 can move relative to the casing 10 in the first direction and in the third direction. Additionally, the holder 42 can expand and contract in the first direction. Hence, when the developing cartridge 1 is inserted into the drum cartridge, the electrical contact surfaces 411 can be moved along the guide protrusion 94 irrespective of the posture of the casing 10. Moreover, the electrical contact surfaces 411 can be brought into contact with the electrical connector 93 in the first direction. As a result, friction of the electrical contact surfaces 411 can be suppressed.

Further, after attachment of the developing cartridge 1 to the drum cartridge, the drum cartridge can perform a "separating operation" in which the developing roller 20 is temporarily pulled away from the photosensitive drum. In the separating operation, a drive force supplied from the image-forming device moves the casing 10 of the developing cartridge 1 toward another side in the third direction relative to the drum cartridge.

At the time of this separating operation, the memory assembly 40 is interposed between the electrical connector 93 and the second guide plate 92 and is fixed in place. Accordingly, while the casing 10 and developing roller 20 move in the third direction, the position of the memory assembly 40 relative to the drum cartridge does not change. Hence, during the separating operation, the state of contact between the electrical contact surfaces 411 and the electrical connector 93 can be maintained. Further, friction between the electrical contact surfaces 411 and the electrical connector 93 can be suppressed.

3. Structure for Recycling

When recycling the developing cartridge 1, the information in the memory 41 is overwritten or the memory 41 itself is replaced. If the holder cover 80 is necessary to be removed from the gear cover 30 for this purpose, the workload required for, for example, recycling is increased. Further, since the holder cover 80 is fastened to the gear cover 30 with a screw, the screw hole formed in the gear cover 30 may become deformed after repeatedly removing and inserting a screw.

Therefore, the developing cartridge 1 according to the present embodiment has a structure for removing the first holder member 50 in a state where the second holder member 60 remains between the gear cover 30 and the holder cover 80. This structure will be described next.

As illustrated in FIGS. 5 through 7, the second holder member 60 has a first through-hole 67 and a second through-hole 68.

The first through-hole 67 penetrates the first boss 64 in the second direction. When the first hook part 522 of the first pawl portion 52 engages with the first corner portion 62, the first hook part 522 can be accessed from outside the second holder member 60 through the first through-hole 67. That is, the first through-hole 67 is a hole that penetrates the first boss 64 in the second direction toward the first hook part 522 from the one side of the second holder member 60 in the second direction.

The second holder member 60 has a surface on the other side in the first direction, and the second through-hole 68 penetrates this surface of the second holder member 60 in the first direction. When the second hook part 532 of the second pawl portion 53 engages with the second corner portion 63, the second hook part 532 can be accessed from outside the second holder member 60 through the second through-hole 68. That is, the second through-hole 68 is a hole that penetrates the second holder member 60 in the first direction toward the second hook part 532 from the other side of the second holder member 60 in the first direction.

When recycling the developing cartridge 1, a screwdriver or other tool is inserted into the first through-hole 67 from the one side of the second holder member 60 in the second direction in a state where the first boss 64 remains inserted into the cover hole 81 of the holder cover 80. Using the distal end of this tool, the first hook part 522 is pressed in a direction away from the first corner portion 62. As a result, the engagement of the first hook part 522 with the first corner portion 62 is released. A screwdriver or other tool is also inserted into the second through-hole 68 from the other side of the second holder member 60 in the first direction. Using the distal end of this tool, the second hook part 532 is pressed in a direction away from the second corner portion 63. As a result, the engagement of the second hook part 532 with the second corner portion 63 is released.

After the engagement of the first pawl portion 52 with the first corner portion 62 and the engagement of the second pawl portion 53 with the second corner portion 63 are released, the first pawl portion 52 and the second pawl portion 53 are subsequently pulled out from the second holder member 60 toward the one side in the first direction, as indicated by the dashed arrow A1 in FIG. 7. Through this operation, the first holder member 50 is removed from the second holder member 60 in a state where the second holder member 60 remains held between the gear cover 30 and the holder cover 80.

Next, information stored on the memory 41 held on the first holder member 50 is overwritten or the memory 41 itself is replaced. Subsequently, the first pawl portion 52 and the second pawl portion 53 of the first holder member 50 are reinserted into the second holder member 60, as indicated by the dashed arrow A2 in FIG. 7. The first pawl portion 52 and the second pawl portion 53 are inserted until the first hook part 522 of the first pawl portion 52 comes into re-engagement with the first corner portion 62 and the second hook part 532 of the second pawl portion 53 comes into re-engagement with the second corner portion 63.

With the developing cartridge 1 according to the structure described above, the second holder member 60 has the first through-hole 67 that allows the first pawl portion 52 of the first holder member 50 to be accessed from outside the second holder member 60. Hence, the engagement of the first pawl portion 52 with the first corner portion 62 can be released by pressing the first pawl portion 52 through the first through-hole 67. In addition, the second holder member 60 of the developing cartridge 1 has the second through-hole 68 that allows the second pawl portion 53 of the first holder member 50 to be accessed from outside the second holder member 60. Hence, the engagement of the second pawl portion 53 with the second corner portion 63 can be released by pressing the second pawl portion 53 through the second through-hole 68. Accordingly, the first holder member 50 can be removed in a state where the second holder member 60 remains between the gear cover 30 and the holder cover 80.

Through this configuration, the holder cover 80 need not be removed from the gear cover 30 when recycling the developing cartridge 1. Thus, the number of steps required for recycling can be reduced. This configuration also eliminates the problem of the screw hole in the gear cover 30 becoming deformed by repeatedly removing and reinserting a screw therein.

As illustrated in FIG. 8, the sleeve part 54 also has a notch 541. The notch 541 is formed in the one side of the sleeve part 54 in the second direction and penetrates a portion of the one side in the second direction. When releasing the engagement of the first pawl portion 52, the first pawl portion 52 bends toward the other side in the second direction, as illustrated in FIG. 7. At this time, a portion of the first pawl portion 52 is inserted into the notch 541. Thus, space in which the first pawl portion 52 can bend can be secured by forming the notch 541 in the sleeve part 54, without requiring the holder 42 to be larger in size.

As illustrated in FIGS. 5 through 7, the guide rib 55 also has a tapered surface 551. The tapered surface 551 is a sloped surface cutting off the corner formed on the other side in the second direction at the end portion of the guide rib 55 on the other side in the first direction. When releasing the engagement of the second pawl portion 53, the second pawl portion 53 bends toward the one side in the second direction, as illustrated in FIG. 7. At this time, a portion of the second pawl portion 53 is displaced into the space cut by the tapered surface 551 on the guide rib 55. Thus, space in which the second pawl portion 53 can be bend can be secured by providing the tapered surface on the guide rib 55, without requiring the holder 42 to be larger in size.

4. Variations of the Embodiment

In the embodiment described above, a memory having electrical contact surfaces is fixed to the outer surface of the holder. However, the electrical contact surfaces that contact the electrical connector may be fixed alone to the outer surface of the holder, while all parts of the memory other than the electrical contact surfaces may be provided elsewhere in the developing cartridge.

The precise shape of the developing cartridge may differ from the shape illustrated in the drawings of this specification. Further, components that appear in the present embodiment and variations described above may be selected as appropriate without departing from the scope of the disclosure.

What is claimed is:

1. A cartridge comprising:
- a housing;
- a storage medium having an electrical contact surface; and
- a holder movable relative to the housing, the holder comprising:
  - a first holder member including the electrical contact surface; and
  - a second holder member engaging with the first holder member,
- wherein the holder has a through-hole through which an engagement part of the second holder member engaging with the first holder member is accessible from outside the cartridge, and
- wherein the through-hole is exposed outside of the cartridge.

2. The cartridge according to claim 1, wherein the first holder member is movable relative to the second holder member in a first direction crossing the electrical contact surface.

3. The cartridge according to claim 2, wherein the holder further comprises:
- an elastic member positioned between the first holder member and the second holder member and configured to expand and contract in the first direction, the elastic member having one end in the first direction connected to the first holder member and another end in the first direction connected to the second holder member.

4. The cartridge according to claim 3, wherein the elastic member is a spring.

5. The cartridge according to claim 4, wherein the elastic member is a coil spring.

6. The cartridge according to claim 1, wherein the through-hole is a hole penetrating the holder in a first direction toward the engagement part, the first direction crossing the electrical contact surface.

7. The cartridge according to claim 1, wherein a first direction crosses the electrical contact surface, and
- wherein the through-hole is a hole penetrating the holder in a second direction toward the engagement part, the second direction crossing the first direction.

8. The cartridge according to claim 7, wherein the holder is positioned at an end portion of the housing at one side in the second direction, and
- wherein the through-hole is a hole penetrating the holder in the second direction toward the engagement part from one side of the second holder member in the second direction.

9. The cartridge according to claim 7, wherein the holder comprises a first boss extending in the second direction, and
- wherein the through-hole is a hole penetrating the first boss in the second direction.

10. The cartridge according to claim 1, further comprising a developing roller positioned at one end of the housing in a third direction,
- wherein the holder is movable together with the electrical contact surface in the third direction relative to the housing.

11. The cartridge according to claim 1, wherein the first holder member includes the storage medium.

12. The cartridge according to claim 1, wherein the storage medium is a memory.

13. The cartridge according to claim 1, wherein the storage medium is configured to store at least one of identification information and lifetime information for the cartridge.

14. The cartridge according to claim 1, further comprising:
- a developing roller rotatable about a rotational axis extending in an extending direction,
- wherein the through-hole extends in the extending direction.

15. A method for recycling a cartridge including a holder having: a first holder member holding an electrical contact surface; and a second holder member with which the first holder member directly engages, the holder having a through-hole, through which an engagement part of the second holder member directly engaging with the first holder member is accessible from outside the cartridge, the method comprising:
- (a) releasing the direct engagement of the first holder member with the second holder member through the through-hole.

* * * * *